G. A. GRIFFIN.
DEEP WELL PUMP.
APPLICATION FILED SEPT. 9, 1912.
1,102,908.
Patented July 7, 1914.
5 SHEETS—SHEET 1.
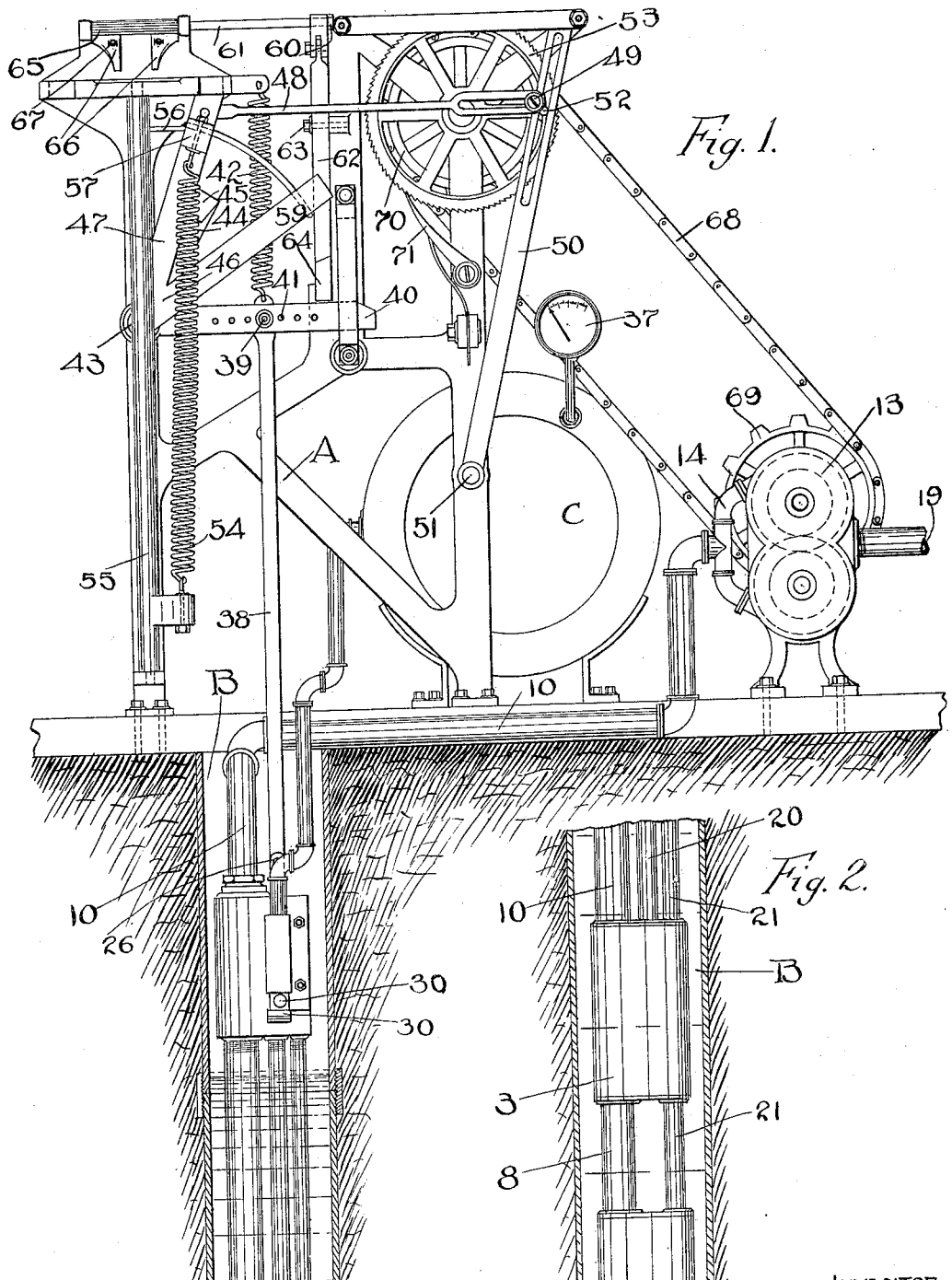
WITNESSES
INVENTOR
George A Griffin
by Lothrop Johnson
his Attorneys.

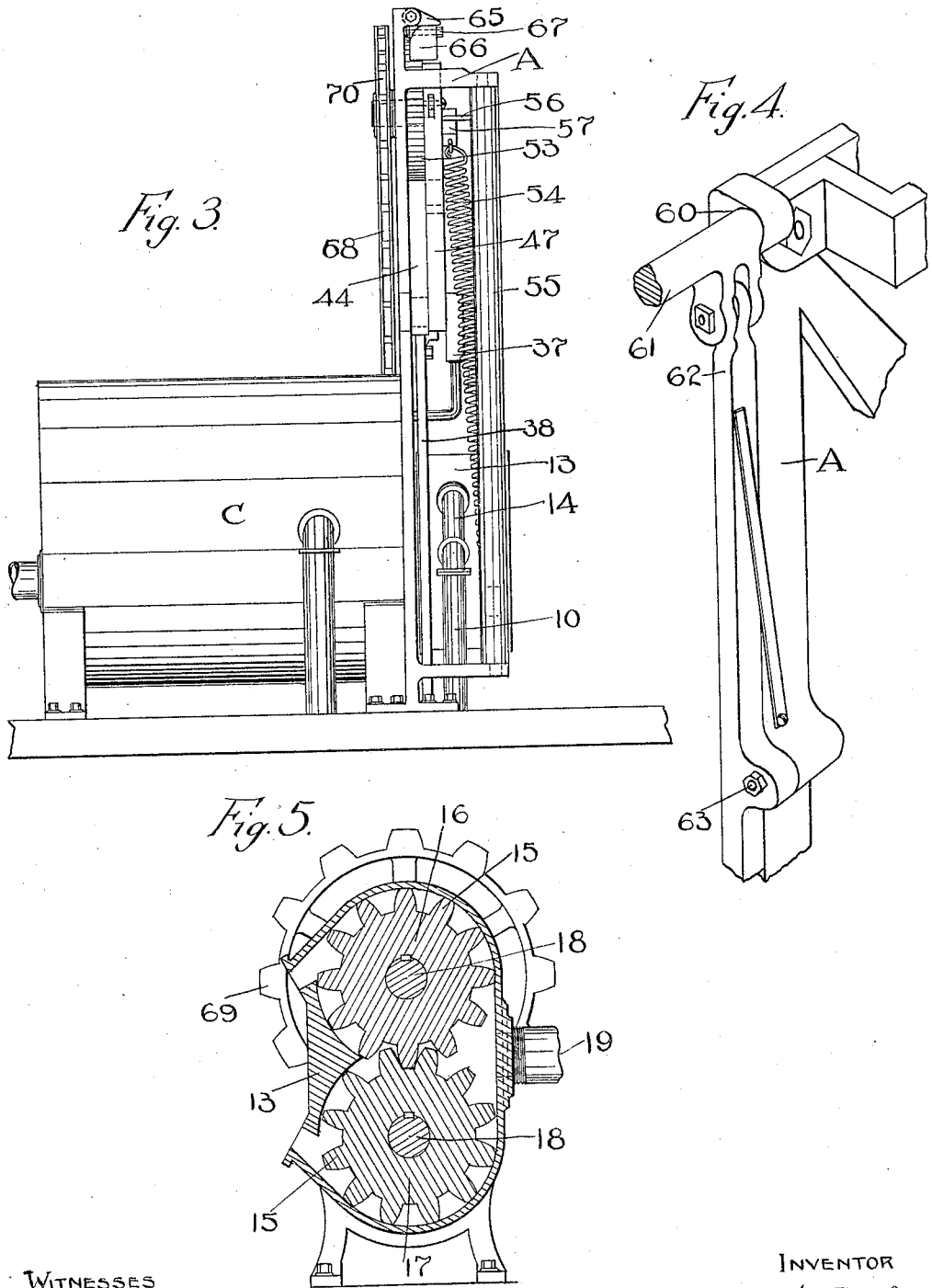

G. A. GRIFFIN.
DEEP WELL PUMP.
APPLICATION FILED SEPT. 9, 1912.
1,102,908.
Patented July 7, 1914.
5 SHEETS—SHEET 3.
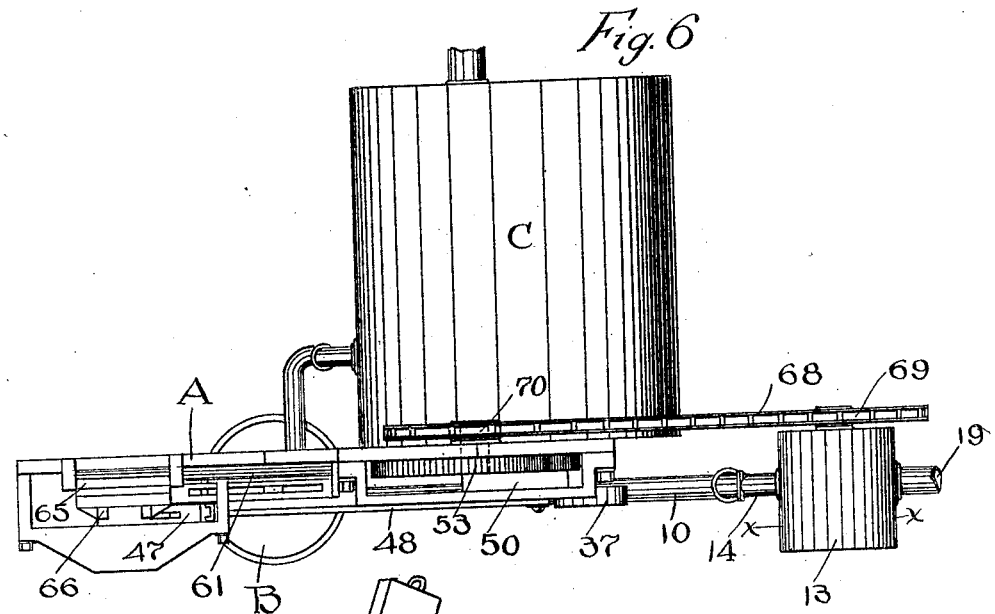
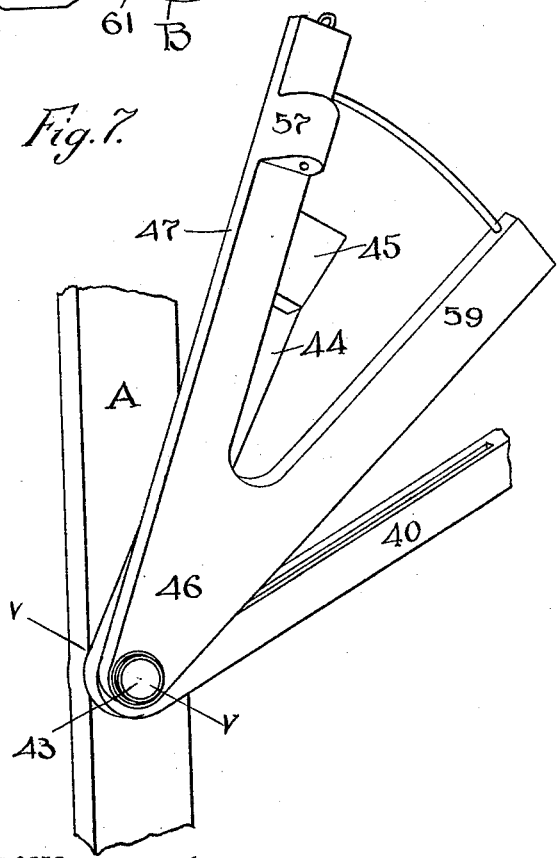
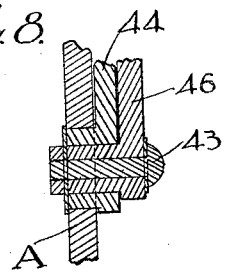
WITNESSES
INVENTOR
George A. Griffin.
By Lothrop & Johnson
his Attorneys

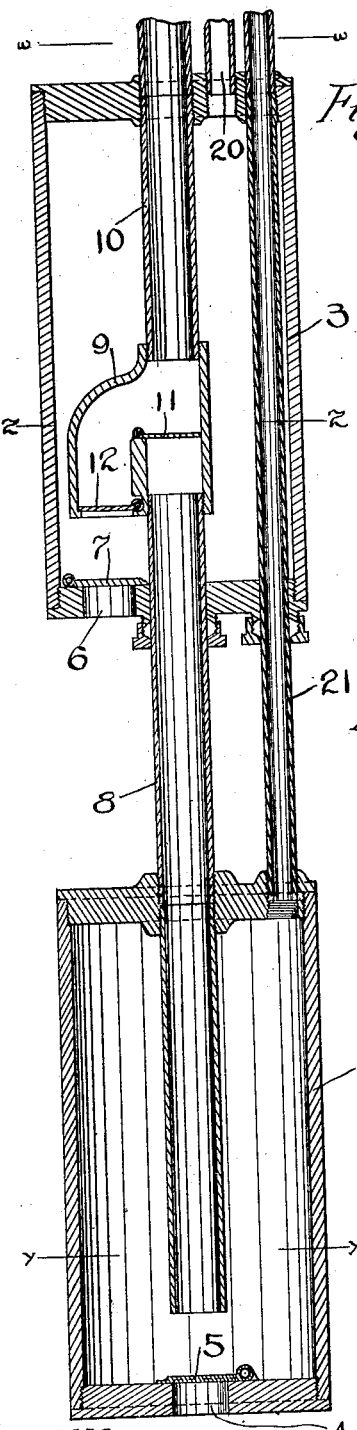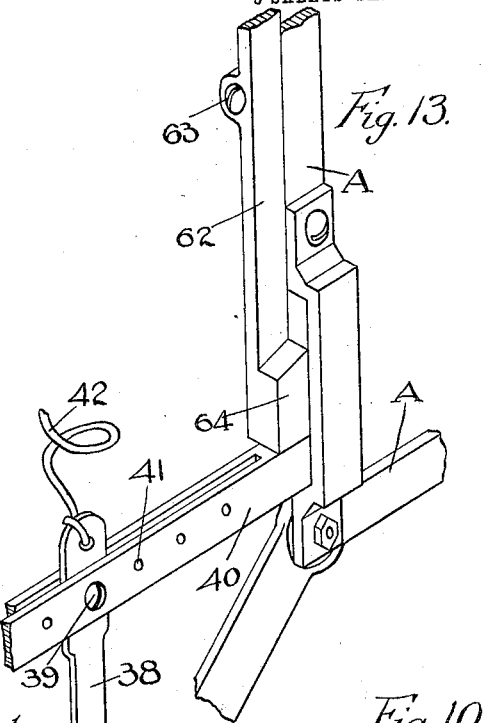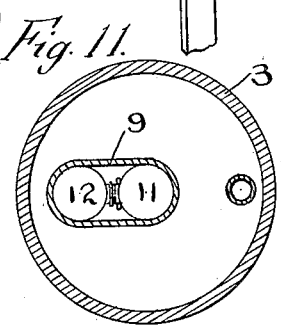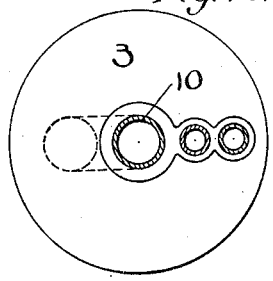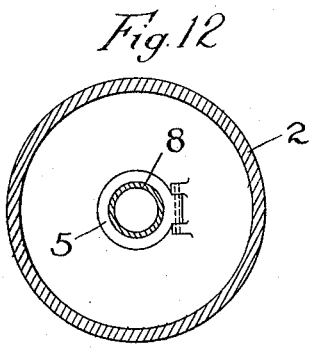

G. A. GRIFFIN.
DEEP WELL PUMP.
APPLICATION FILED SEPT. 9, 1912.
1,102,908.
Patented July 7, 1914.
5 SHEETS—SHEET 5.
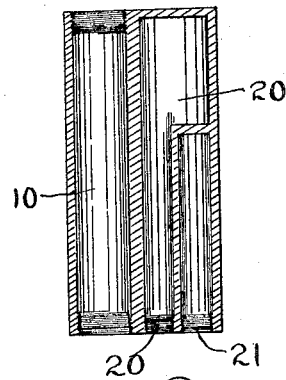
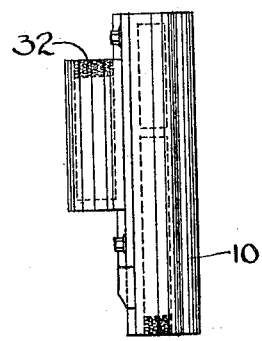
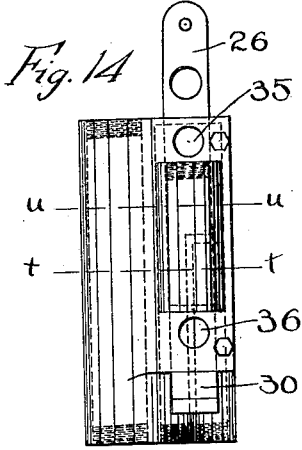
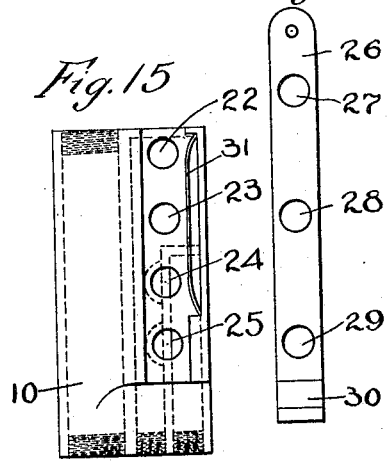
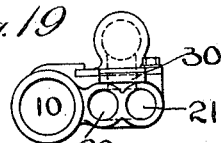
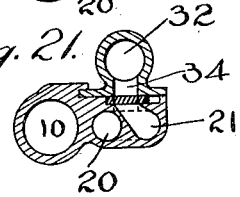
WITNESSES
INVENTOR
George A Griffin
By Lathrop & Johnson
his Attorneys.

UNITED STATES PATENT OFFICE.

GEORGE A. GRIFFIN, OF FELTON, MINNESOTA.

DEEP-WELL PUMP.

1,102,908.     Specification of Letters Patent.     Patented July 7, 1914.

Application filed September 9, 1912. Serial No. 719,345.

*To all whom it may concern:*

Be it known that I, GEORGE A. GRIFFIN, a citizen of the United States, residing at Felton, in the county of Clay and State of Minnesota, have invented certain new and useful Improvements in Deep-Well Pumps, of which the following is a specifiaction.

My invention relates to improvements in deep well pumps, its object being particularly to provide an improved construction for lifting the water from deep wells through air pressure.

To this end the invention consists in the construction, combination, and arrangement of parts hereinafter described and claimed.

In the accompanying drawings forming part of this specification, Figure 1 represents a side elevation of the apparatus showing a well in section, the water chamber portion of the apparatus and inclosing well being broken away; Fig. 2 is a similar view of the lower or water chamber end of the pumping apparatus showing the inclosing well in section, Fig. 2 forming a downward continuation of Fig. 1; Fig. 3 is a side elevation of a compressed air reservoir and associated parts; Fig. 4 is a detail view of part of the controlling mechanism for the air controlling valve; Fig. 5 is a section through a water turbine forming part of the actuating mechanism, taken on line $x$—$x$ of Fig. 6; Fig. 6 is a top view of the compressed air reservoir and associated parts; Fig. 7 is a detail view of part of the controlling mechanism for the air controlling valve; Fig. 8 is a section on line $v$—$v$ of Fig. 7; Fig. 9 is a vertical section through the water chambers, forming the lower end of the pumping apparatus; Fig. 10 is a section taken on line $w$—$w$ of Fig. 9; Fig. 11 is a section on line $z$—$z$ of Fig. 9; Fig. 12 is a section on line $y$—$y$ of Fig. 9; Fig. 13 is a detail view of part of the controlling mechanism for the air controlling valve; Fig. 14 is a side elevation of the air control valve and support; Fig. 15 is a similar view with the air inlet and slide valve removed; Fig. 16 is a detail view of the slide valve; Fig. 17 is a side elevation of the valve support with the valve removed; Fig. 18 is a vertical cross section; Fig. 19 is a bottom view of the valve and support; Fig. 20 is a section on line $u$—$u$ of Fig. 14; and Fig. 21 is a section on line $t$—$t$ of Fig. 14.

Referring to the drawings, A represents the framework of the pumping mechanism supported above the well B. Positioned within the well and adapted to stand below the water level therein are the chambers 2 and 3. The chamber 2 is formed with a bottom inlet opening 4 closed by a flap valve 5, and the chamber 3 with a similar opening 6 closed by a flap valve 7, whereby said chambers will be kept filled with water except when water is being driven therefrom, as hereinafter set forth. An outlet pipe 8 leads from the chamber 2 to the chamber 3; connecting the chamber 3, through the medium of a chamber 9, with an outlet pipe 10 leading upwardly from the water chamber 3. The chamber 9 is closed with respect to the pipe 8 by an upwardly opening flap valve 11 and similarly closed with respect to the water chamber 3 by a flap valve 12. The discharge pipe 10 leads from the chamber 3 to a water turbine 13. The discharge pipe 10 opens into the upper and lower sides of the turbine through branch pipes 14 whereby to direct the discharge stream against the outwardly extending teeth 15 of the intermeshing superimposed turbine wheels 16 and 17. The turbine wheels have journal support 18 in the turbine casing and the discharge stream in passing through said casing to the outlet pipe 19 will rotate said turbine wheels for the purpose hereinafter more specifically pointed out.

Mounted upon the discharge pipe 10 above the upper water chamber is the air controlling mechanism shown specifically in Figs. 14 to 21. This includes the air conduit 20 extending downwardly into the top of the water chamber 3, and an adjacent conduit 21 extending downwardly into the top of the water chamber 2. Opening into the upper end of the conduits 20 and 21 are the ports 22, 23, 24, and 25. The first two mentioned ports open into the conduit 20 and the last two into the conduit 21. Coöperating with said ports is a slide valve 26, formed with ports 27, 28, and 29, and formed at its lower end with a stop 30 to abut the adjacent framework and limit the upward movement of the valve. The valve is held in laterally pressed position by a suitable spring 31. Fixedly supported outside the conduits 20 and 21 is the lower end of an air conduit 32 leading upwardly to the compressed air reservoir C. The lower end of the air conduit 32 is separated from the conduits 20 and 21 by the slide valve 26 and is formed with ports 33 and 34, and adapted to be brought into registration with the inlet ports 23 and 24 of the conduits 20 and 21, as hereinafter pointed out. The port 22 of the air conduit 20 and the lower part 25 of the air conduit 21 are adapted to be brought into registration with the ports 35 and 36 of the outer casing as hereinafter pointed out to connect the conduits 20 and 21 with the outer air. The compressed air reservoir is of usual construction formed with an indicating gage 37 and adapted to be supplied with compressed air in any suitable manner.

The slide valve 26 is pivotally connected with an upwardly extending rod 38, said rod having pivotal support 39 at its upper end upon a horizontally extending pivoted arm 40. The upper end of the rod 38 may be adjustably supported upon said arm through the medium of a plurality of pivot openings 41 and is connected with the overhead framework by a spring 42. The arm 40 has pivotal support 43 upon the framework and carries at its pivotally supported end an upwardly extending arm 44, said arm 44 at its upper free end being formed with a forward extension 45. Also mounted upon the pivot 43 is an elbow lever 46, the free end of the outer arm 47 of said lever being pivotally connected with a pitman 48, said pitman having slot and pin connection 49 at its opposite ends with a lever arm 50. The lever arm 50 has fulcrum support 51 upon the framework and slot and pin connection 52 with a ratchet wheel 53 operated as hereinafter more specifically set forth. The upper end of the outer arm of the elbow lever 46 is connected by a spring 54 with the lower end of a rotatably supported post 55, by means of which spring tension is exerted upon the elbow lever when said elbow lever passes dead center. The post 55 is rotatably supported and carries at its upper end laterally extending pins 56 to be engaged by the forwardly extending ear 57 upon the outer free end of the elbow lever in the actuation of the mechanism. The forward extension 45 of the lever arm 44 stands between the outer arm 57 and inner arm 59 of the elbow lever 46, as shown.

Arranged to work in connection with the free end of the lever arm 40 is the following described mechanism: Having pivotal connection 60 at one end with a horizontal rotatable rod 61 is a depending lever 62, said lever having central fulcrum support 63 upon the framework and at its lower end being formed with a laterally extending stop 64 to bear against the upper or lower side of the lever arm 40 as the case may be. The shaft 61 at its outer end is formed with an outwardly extending rib 65 underneath which trip dogs 66 have pivotal support 67 on the framework in position to be struck by the upper end of the outer arm elbow 46 as hereinafter pointed out.

The ratchet wheel 53 is operated from the turbine 13 through the medium of an endless chain 68 running at one end over a sprocket 69 mounted upon the upper turbine wheel shaft 18, said chain at its opposite end running over a sprocket wheel 70 secured upon the supporting shaft of the wheel 53. The wheel 53 has pawl and ratchet control 71.

Where it is desired to utilize my improved apparatus in the pumping of water the tank C is supplied with compressed air. We will assume that the mechanism stands as shown in Fig. 1, in which position the slide valve is holding the pipe 32 leading from the air reservoir connected with the air conduit 20, the exhaust opening of the conduit 20 being held closed by the slide valve and the exhaust opening of the conduit 21 being in exhausting connection with the outer air. In this position of the parts the compressed air will pass from the chamber C through the conduit 20 to the upper water chamber 3, the compressed air forcing the water from the chamber 3 past the flap valve 12 and through the discharge pipe to the water turbine. The water in discharging through the water turbine actuates the turbine and through the medium of the chain 68, wheel 53, and pitman 48, throws the elbow lever upon its fulcrum support 43 into extreme outer position. As the elbow lever passes to extreme outer position it strikes the trip dog 66 rotating the shaft 61 and turning the locking lever 62 out of engagement with the valve rod supporting arm 40. Also as the elbow lever is thrown to outer position upon its fulcrum the lower arm of the elbow lever strikes the upper end 45 of the arm 44 lifting the connected arm 40 and with it the slide valve 26 to bring the slide valve into position connecting the air conduit 21 with the air reservoir and connecting the conduit 20 with the outer air. As the elbow lever is carried to outer position it turns the post 55 to bring the spring 54 to the outer side of the post. It will thus be evident that as soon as the outer arm of the elbow lever passes dead center, which likewise turns the post and spring 54, the spring 54 will exert a downward pull upon the outer arm of the elbow lever to force it immediately to outer position, this carrying of the lever to outer position by the spring being allowed by the slot and pin connection between the opposite end of the pitman 48 and lever arm 50. Likewise when the elbow lever passes dead center in the opposite direction it is immediately carried to the limit of its movement by the spring 54. It will thus be evident that in the movement of the elbow arm in one direction the slide valve 26 is actuated to allow the compressed air to enter one of the water chambers and discharge the contained water through the turbine and in the opposite movement of the elbow lever the compressed air is allowed to enter the other chamber and discharge its contained water through the water turbine, the water turbine actuating the mechanism which controls the action of the slide valve. As pointed out, when the compressed air reservoir is in communication with one water chamber to force the water therefrom the other water chamber is held by the controlling slide valve in air exhausting communication with the outer atmosphere. It will thus be evident that as long as the air reservoir contains the necessary compressed air and communication between it and the slide valve is open, the apparatus will be continuously actuated to alternately force the water from the submerged water chambers through the discharge outlet to the turbine. By the use of compressed air in the manner set forth, I am enabled to efficiently raise water from a greater depth than is possible with the pumping means ordinarily employed.

It will be evident that the specific features of construction and combination shown and described may be more or less modified without departing from my invention, the scope of which is defined in the following claims.

I claim as my invention:

1. In combination with a well, a pumping apparatus therefor comprising water chambers submerged in said well, a compressed air reservoir connected with said chambers, a controlling valve for said connection, a discharge outlet for said chambers, means for actuating said valve comprising a water turbine included within the discharge outlet, an elbow lever operatively connected with said turbine, spring means for carrying said elbow lever from dead center to extreme positions, and spring controlled lifting means for the valve operative from said lever.

2. In combination with a well, a pumping apparatus therefor comprising water chambers submerged in said well, a compressed air reservoir connected with said chambers, controlling valve mechanism for said connection, a discharge outlet for said chambers, means for actuating said valve comprising a water turbine included within the discharge outlet, an elbow lever operatively connected with said turbine, spring means for carrying said elbow lever from dead center to extreme positions, spring controlled lifting means for said valve operative from said lever, a locking device for said lifting means, and means actuated from said elbow lever for disengaging said locking device.

In testimony whereof I affix my signature in presence of two witnesses.

GEORGE A. GRIFFIN.

Witnesses:
E. A. WESTIN,
ROMAN J. BRAUN.